March 7, 1950 — L. S. HAMER — 2,499,383
DOUBLE GATE VALVE
Filed April 23, 1946 — 2 Sheets-Sheet 2
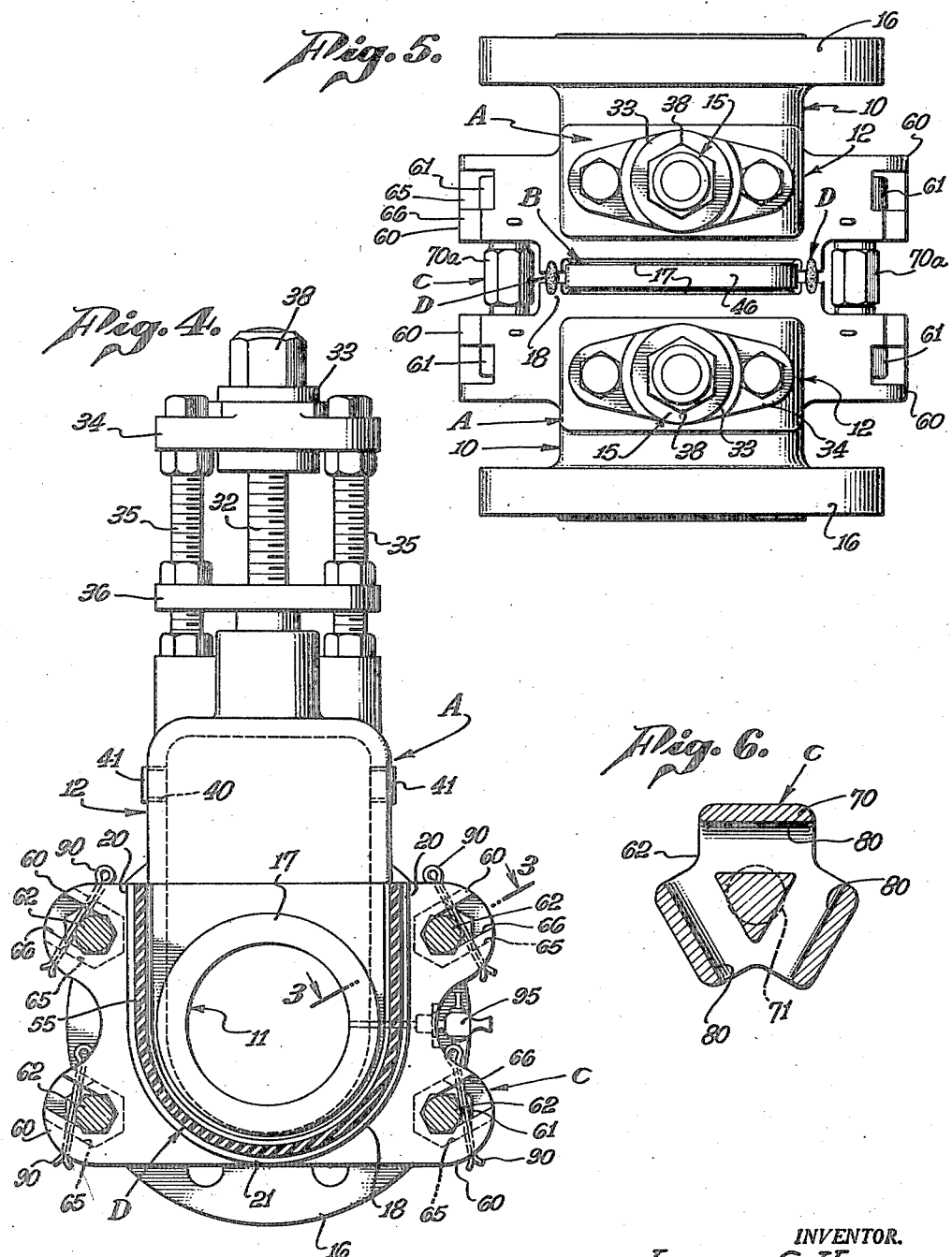
INVENTOR.
LELAND S. HAMER,
BY
ATTORNEY.

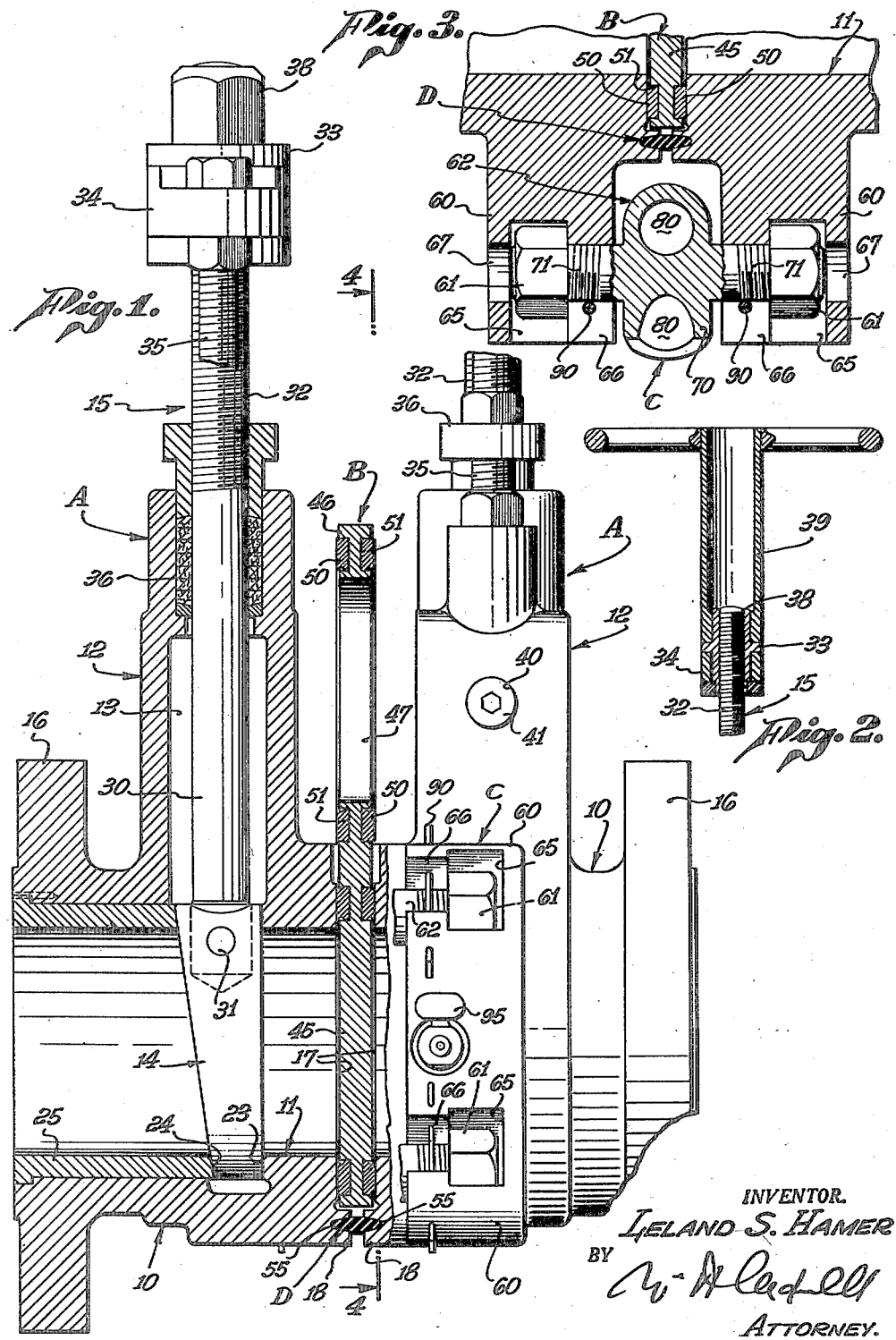

Patented Mar. 7, 1950

2,499,383

UNITED STATES PATENT OFFICE 2,499,383

DOUBLE GATE VALVE

Leland S. Hamer, Long Beach, Calif., assignor of one-fourth to Paul A. Dewhirst, Los Angeles, Calif.

Application April 23, 1946, Serial No. 664,349

12 Claims. (Cl. 277—67)

This invention has to do with a double gate valve and it is a general object of the invention to provide a double gate valve with a positive shut-off and which is useful generally in a pipe line or the like where fluid may have to be positively shut off from either direction.

There are various situations where flow must be controlled by a device such as a gate valve, but where a single gate valve is not sufficiently dependable and, therefore, two gate valves are employed.

It is a general object of my present invention to provide a unit which involves a double gate valve giving the character of general control obtainable where two gate valves are ordinarily employed, which unit includes a blinding plate whereby a positive shut-off can be established to supplement either one or both of the gate valves. With the construction that I have provided the blinding plate can be operated to effect a positive shut-off against flow in either direction, and when it is in operating position one of the gate valves is out of service so that repairs can be made on it at will.

It is a further object of my present invention to provide a unit or structure such as I have referred to which is simple and compact, making it practical for use in pipe lines such as are found in refineries and the like. By my invention I provide a structure that occupies but little space and is far more simple and easy to operate than the usual series of independent units such as are now employed to accomplish results of the general character that I attain.

The various objects and features of my invention will be fully understood from the following detailed description of a typical preferred form and application of my invention, throughout which description reference is made to the accompanying drawings, in which:

Fig. 1 is a view of the structure that I have provided with parts at one end of the structure broken away to show in section. Fig. 2 is a reduced view illustrating an operating tool applied to one of the gate units of the structure. Fig. 3 is a detailed sectional view taken substantially as indicated by line 3—3 on Fig. 4. Fig. 4 is a transverse sectional view of the structure taken substantially as indicated by line 4—4 on Fig. 1. Fig. 5 is a plan view of the structure and Fig. 6 is a detailed cross sectional view of a part of the structure shown in Fig. 3.

The device that I have provided involves, generally, two valve units A, a plate B acting between the valve units, a single means C connecting and operating the valve units and an intermediate section D between the valve units cooperating therewith to form a plate receiving chamber. In carrying out my invention I may employ valves of different forms or types. However, I prefer to use gate valves and I will therefore describe the valve units as being of this type.

Each valve unit A has a body with a tubular main portion 10 having a central fluid passage 11, a lateral extension 12 forming a chamber 13 that intersects the passage 11, a gate 14 and operating means 15 for the gate.

The body 10 of each valve unit has connecting means such as a connecting flange 16 at its outer end and, in practice, any suitable form of connecting means can be provided to facilitate connection of the valve unit with the end of a pipe line or the like. The inner end of the body 10 is characterized by an annular seat 17 for the reception of the plate B and a U-shaped flange 18 engaged around the sides and lower portion of the seat and formed to carry the section D. In the particular form of the invention illustrated the seat 17 is a flat, smooth, annular seat in a plane transverse of the longitudinal axis of the body section 10.

The flange 18 preferably projects axially somewhat beyond or inward of the seat and has vertical side portions 20 projecting up somewhat beyond the seat 17 and with their lower end portions joined by a curved portion 21 concentric with the seat and extending around, under, or beneath the seat.

The extension 12 of the gate unit is laterally disposed relative to the body section 10 and establishes the chamber 13 which intersects the passage 11. In practice I prefer to form or cast the extension 12 integrally with the body portion 10, as shown throughout the drawings.

The gate 14 may be of any suitable form or shape. However, I prefer to employ a wedge-shaped gate and in the particular construction illustrated the gate has one side cooperating with a fixed or permanent seat 23 in the main portion 10 and has the other side cooperating with a seat 24 established on the inner end of a removable sleeve 25 inserted in the portion 10 from its outer end, the relationship of parts being such that the gate can be removed through the outer end portion of the body when the insert or sleeve 25 is removed. The chamber 13 is such as to allow movement of the gate 14 between a down or acting position, as shown in Fig. 1, and an up or retracted position where it is entirely within the extensions 12 allowing free passage through the body portion 10.

The means provided for operating the gate 14 may be any suitable means that will effect movement of the gate between the two positions above described. In the particular case illustrated the operating means 15 involves, generally, a stem having a lower end portion 30 connected to the gate by a removable pin 31 and a threaded upper end portion 32, a nut member 33 carries the threaded portion of the stem and is held in a bracket 34 supported on posts 35 projecting upwardly from the extension 12, and a packing means 36 is provided around the stem where it passes out of the extension 12. The nut 33 has a head to be engaged by a tool, for instance by a suitable operating tool. I have shown the head in the form of a polygonal part 38 and I have shown the operating tool in the form of a socket wrench 39 that can be applied to the head when desired. Access openings 40 are provided in the extension 12 and are normally closed by plugs 41. The openings 40 are located so that the parts can be positioned to facilitate application and removal of the pin 31 that connects the gate with the stem.

The plate B is preferably of the type ordinarily known as a blinding plate, in which case it has one end section 45 that is solid or imperforate and has another end portion 46 that has a flow passage 47 formed through it. The plate is such that either end portion can be employed at will. The gate sections A are coupled and related in the manner shown in Fig. 1 through the means C so that their faces 17 are opposed and spaced apart for the reception of the end portions 45 and 46 at the plate. The means C as I will hereinafter describe is operable to move the sections A relative to each other to free them from or clamp them to the plate. In practice I prefer to provide means for sealing between the faces 17 and the plate. The sealing means may involve any suitable form of sealing parts or devices carried by either one or both of the parts to be sealed. In the case illustrated I have shown sealing rings 50 carried in channels or recesses 51 provided in the faces of the two plate parts 45 and 46.

The intermediate section D of the structure is a U-shaped part conforming generally in configuration to the flanges 18 on the inner ends of the valve units. I preferably form the section as a single elongate part and I make it of a somewhat conformable material so that it will remain in seated or cooperating engagement with the two sections A throughout movement of the sections relative to each other to allow for insertion and removal of the plate B. In practice the section D may be formed of a rubber-like composition or of any suitable material having the desired resilience. In the particular construction illustrated sealing engagement is established between the section D and the flanges 18 of the valve sections A by providing wedge-shaped channels 55 in the opposed faces of the flanges 18 and by shaping the section D to seat or wedge into the channels. By shaping the section D to correspond to the flanges 18 and by making the section co-extensive with the flanges the section D fits between the valve sections A establishing an upwardly opening chamber for the reception of the plate B. The form or shape of this chamber is shown in Fig. 4 of the drawings.

The connecting means C serves to both join or connect the sections A to tie them together and also is operable to move the sections relative to each other for the purpose of spreading them away from the plate B or for clamping them onto the plate B. In accordance with the preferred form of my invention I provide two or more pairs of lugs 60 at each side of the structure which lugs carry nuts 61 which in turn carry tie members 62. One lug 60 of each pair is provided on one of the valve sections A so that each unit of the means C forms a coupling between the two valve sections.

In the preferred form of the invention shown in the drawings I provide two pairs of lugs at each side of the structure so that there are four units of the means C distributed around the parts of the valve units A desired to be moved apart or clamped together relative to the plate B. Each lug 60 projects laterally or from the side of the valve unit on which it is formed and it is characterized by a downwardly and inwardly extending socket 65 provided to carry a nut 61, by a notch 66 in the inner side portion of the lug communicating with the socket and adapted to receive the tie member 62, and by a hole 67 in the outer side portion of the lug communicating with the socket 65 and adapted to register with the tie member when the parts are in working position.

The socket 65, provided in each lug 60, is shaped and proportioned to readily receive a nut 61 so that the nut engages one or more walls of the socket to be held against rotation in the socket. By forming the socket 65 to extend downwardly and inwardly in the lug a nut is readily insertable into the socket and will not become dislodged therefrom unless deliberately moved.

The tie member 62 involves, generally a central head 70 and a threaded projection 71 at each side of the head which projections are threaded into the nuts 61 in the opposed lugs 60. The head 70 may be formed or shaped in any suitable manner to receive an operating tool such as a wrench or a bar. In the case illustrated in Figs. 3 and 6 of the drawings I have shown the head 70 in the form of an enlargement having suitably disposed openings 80 suitable for the reception of an operating bar. In Figs. 4 and 5 of the drawings I have illustrated a head 70$^a$ in the form of a tool engaging part which is polygonal in cross sectional configuration, making it such as to conveniently receive a wrench.

It is to be observed that with the arrangement that I have provided the two lugs 60 of each pair of lugs of a unit of means C are spaced a substantial distance apart so that the head 70 of the tie member is received between the lugs. The threaded projections 71 of the tie member are in alignment with each other and thread into or through the nuts 61. The openings 67 are located in the lugs so that the extensions 71 may enter them as the valve sections A are moved together so that there is no interference with proper movement of the valve sections A.

In order that rotation of the tie member 70 will effect movement of the body sections A relative to each other the threads on the two projections 71 of the tie member are different or, in other words, I establish a differential relationship between the threaded engagement between the tie member and the two lugs which it joins. In practice I may, as I have shown in the drawings, provide a lefthanded thread on one projection 71 and a right-handed thread on the other projection 71. However, I wish it understood that the differential relationship can be gained in any suitable manner, for instance, I may, if I desire, provide like thread on the two projections 71 varying only as to degree of pitch. In the latter case I will gain very slight movement of the valve units A relative to each other for a given rotation of the tie member, whereas if the threads are pitched oppositely as I have shown in the drawings I will gain a substantial movement of the units A for such a given movement of the tie member. In practice I preferably provide means for releasably retaining the tie member in connection with the lugs 60. In the drawings I have shown retaining pins 90 engaged across the notches 66 which facilitate entry of the tie member into operating position and when the pins 90 are in place the tie member is effectively held in operating position.

From the foregoing description it will be apparent that when the tie member is rotated in one direction the lugs 60, coupled to it, will be moved in a given direction, say, for instance, toward each other, whereas if the tie member is rotated in the opposite direction the units A will be moved in the opposite direction or apart.

The means D as above described acts between the sections A to prevent leakage of fluid from the device when the device is being operated to change position of the means B, assuming that the line to which the device is connected is not under head. In the preferred form of the invention I provide pet cocks 95 located on both sides of the means B and in connection with the fluid passages 11 between the gates 14 and the means B. In situations where the device is operated under pressure the pet cocks 95 can be opened to relieve the pressure from the fluid passages after the gates 14 have been closed, and before the means C is operated to release the means B.

From the foregoing description it is believed that the operation of the structure will be fully understood. The valve units A can be operated whenever desired, for instance, they may be operated independently so that they are either both open or both closed, or one is open while the other is closed. Likewise the plate B can be positioned in any desired manner between the sections A, that is, it can be arranged as shown in Fig. 1 so that it forms a positive shut-off between the valve units A or it can be reversed from the position shown, in which case it leaves unrestricted flow between the valve units A. To manipulate the plate B the several units of the means C are operated to either spread the valve units apart or to clamp them together, and during operation of the means C the intermediate section D of the structure maintains an upwardly opening U-shaped chamber between the sections A for the reception of the plate B which chamber prevents leakage that would otherwise occur.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A device of the character described including, two like opposed relatively movable valve units each having a body with connecting means at its outer end and having a gate operating in the body, each body having a sealing face at its inner end and spaced side lugs intermediate its ends, a plate arranged between the units and engaged by the faces of the units, and tie members connecting the lugs of the two units together operable to move the units relative to each other into clamping engagement with the plate, the tie members having parts between the lugs engageable by an operating tool.

2. A device of the character described including, two like opposed relatively movable valve units each having a body with connecting means at its outer end and having a gate operating in the body, each body having a sealing face at its inner end and spaced side lugs intermediate its ends, a plate arranged between the units engaged by the faces of the units, and tie members connecting the lugs of the two units together operable to move the units relative to each other into and out of clamping engagement with the plate, the tie members having apertured portions between the lugs engageable by an operating tool.

3. A device of the character described including, two like opposed relatively movable valve units each having a body with connecting means at its outer end and having a gate operating in the body, each body having a sealing face at its inner end and spaced side lugs intermediate its ends, a plate arranged between the units engaged by the faces of the units, and tie members having threaded connection with the lugs of the two units to connect the units together, the tie members being operable to move the units relative to each other into and out of clamping engagement with the plate each end of each tie member having threaded engagement with a lug.

4. A device of the character described including, two like opposed relatively movable valve units each having a body with connecting means at its outer end and having a gate operating in the body, each body having a sealing face at its inner end and spaced side lugs intermediate its ends, a plate arranged between the units engaged by the faces of the units, and tie members having differential threaded connection with the lugs of the two units to connect the units together, the tie members being operable to move the units relative to each other into and out of clamping engagement with the plate.

5. A device of the character described including, two like opposed relatively movable valve units each having a body with connecting means at its outer end and having a gate operating in the body, each body having a sealing face at its inner end and spaced side lugs intermediate its ends, a plate arranged between the units engaged by the faces of the units, nuts carried by the lugs, and tie members threaded to the nuts connecting the lugs of the two units together operable to move the units relative to each other into and out of clamping engagement with the plate.

6. A device of the character described including, two like opposed relatively movable valve units each having a body with connecting means at its outer end and having a gate operating in the body, each body having a sealing face at its inner end and spaced side lugs intermediate its ends, a plate arranged between the units engaged by the faces of the units, nuts carried by the lugs, and tie members threaded to the nuts connecting the lugs of the two units together operable to move the units relative to each other into and out of clamping engagement with the plate, the nut engaging threads of each tie member causing differential movement of the nuts engaged therewith.

7. A device of the character described including, two like opposed relatively movable valve units each having a body with connecting means at its outer end and having a gate operating in the body, each body having a sealing face at its inner end and spaced side lugs intermediate its ends, a plate arranged between the units engaged by the faces of the units, there being sockets in the lugs, nuts carried in the sockets against rotation, and tie members threaded to the nuts connecting the lugs of the two units together operable to move the units relative to each other into and out of clamping engagement with the plate.

8. A device of the character described including, two like relatively movable opposed valve units each having a body and a gate operating in the body, a plate arranged between the units having sealing engagement directly with the bodies of the units, an intermediate section of yielding material between the bodies of the units forming an upwardly opening chamber receiving the plate, and means coupling the units together operable to move the units relative to each other to clamp them to the plate.

9. A device of the character described including, two like relatively movable opposed valve units each having a body and a gate operating in the body, a plate arranged between the units having sealing engagement directly with the bodies of the units, a U-shaped intermediate section of yielding material between the bodies of the units forming an upwardly opening chamber receiving the plate, and means coupling the units together and operable to move the units relative to each other to clamp them to the plate.

10. A device of the character described including, two like relatively movable opposed valve units each having a body and a gate operating in the body, a plate arranged between the units having sealing engagement directly with the bodies of the units, an intermediate section of yielding material between the bodies of the units forming an upwardly opening chamber receiving the plate, and a plurality of threaded ties located at the exterior of said chamber and coupling the units together and operable to move the units relative to each other to clamp them to the plate.

11. A unitary structure of the character described including, two like opposed relatively movable valve units each including a body, a gate carried by the body and operating means for the gate carried by the body, a plate arranged between the units having sealing engagement directly with each of the units, and means coupling the units together and operable to move the units relative to each other to free them from or clamp them to the plate including lugs on the sides of the bodies of the units and differential screw members connecting the lugs of the two units.

12. A device of the character described including, two like opposed relatively movable valve units each having a body with connecting means at its outer end and having a gate operating in the body, each body having a sealing face at its inner end and spaced side lugs intermediate its ends, an upwardly opening U-shaped member of yielding material extending between the inner ends of the bodies, a plate arranged between the units and within said member, the plate being engaged by the faces of the units, and tie members connecting the lugs of the two units together and operable to move the units relative to each other into clamping engagement with the plate, the tie members having parts between the lugs engageable by an operating tool.

LELAND S. HAMER.

REFERENCES CITED

The following references are of record in the file of this patent:

UNITED STATES PATENTS

| Number | Name | Date |
|---|---|---|
| 38,138 | Bond | Apr. 7, 1863 |
| 789,132 | Bachman | May 9, 1905 |
| 1,575,259 | Fisher | Mar. 2, 1926 |
| 1,613,138 | Seymour | Jan. 4, 1927 |
| 1,813,418 | O'Leary | July 7, 1931 |
| 1,981,825 | Miller | Nov. 20, 1934 |
| 2,200,416 | Daniels | May 14, 1940 |
| 2,214,959 | Hamer | Sept. 17, 1940 |